INVENTORS
RYOTA NOTOMI
TERUCHIKA KANOH
BY TOMUYUKI MATSUGU

United States Patent Office 3,576,658
Patented Apr. 27, 1971

3,576,658
**MANUFACTURING PROCESS OF SIMULTANE-
OUSLY BIAXIALLY ORIENTED THERMOPLAS-
TIC RESIN FILM WITH COATED SURFACE**
Ryota Notomi, Teruchika Kanoh, and Tomoyuki Matsugu, Shizuoka-ken, Japan, assignors to Kohjin Company, Limited, Tokyo, Japan
Filed May 28, 1968, Ser. No. 732,580
Int. Cl. B29d 7/24; B05c 3/017
U.S. Cl. 117—7                                                                8 Claims

ABSTRACT OF THE DISCLOSURE

The present invention relates to a process for manufacturing a coated, simultaneously biaxially oriented film by applying onto the inside surface of an unoriented tubular film formed of a thermoplastic resin, a coating liquid as has the characteristics to wet the inside of the film and which consists of water containing therein a coating material, and then drawing the film longitudinally between spaced pairs of nip rolls which such tubular film is heated to a temperature which allows the orientation of the film and is higher than the boiling temperature of the coating liquid to thereby vaporize the water therefrom. Concomitantly with the heating thereof, a pressurized gas is delivered into the tubular film to thereby stretch the film in its transverse direction by the pressure of such gas at the same time as the film is stretched in its longitudinal direction by the spaced pairs of nip rolls.

---

The present invention relates to a manufacturing process of a simultaneously biaxially oriented thermoplastic resin film which is coated with slipping agent, antistatic agent, heat and pressure sensitive adhesive material, etc. on a surface thereof.

In order to coat the surface of a simultaneously biaxially oriented thermoplastic resin tubular film with slipping agent, antistatic agent, heat and pressure sensitive adhesive material, etc., it has until now been an ordinary method to cut open the tubular film which has been simultaneously biaxially oriented in tubular form, coat by suitable means, such as a roll coater, gravure roll coater or air knife coater, a surface of such film with a solution or a dispersed liquid of such coating materials as mentioned above, and then to dry the same.

This method of coating the material on the surface of the oriented film has such disadvantages that a large coating equipment is required, that the control of operational conditions is difficult as it requires higher coating technics in order to prevent the formation of creases on the film while coating relatively thin oriented film, and that the material coated on the film must be dried at a temperature below the shrinking temperature of the film insofar as the oriented film shrinks by heating. Thus, such known method results in low productivity, and further is expensive due to the high equipment cost.

The present invention is directed to a process for manufacturing a coated, simultaneously biaxially oriented film which does not require such large coating equipment as conventionally adopted and involves a lower processing cost than that of the conventional method described above. In the process of the present invention an unoriented tubular film of thermoplastic resin is stretched in its tubular shape after having its inner surface uniformly wetted with a coating liquid which has a characteristic to wet the film surface uniformly, and without first drying of such coating liquid.

The present invention relates to a process for manufacturing coated simultaneously biaxially oriented film by feeding into an unoriented tubular film, formed of thermoplastic resin, a coating liquid as has the characteristics to wet the inside surface thereof and which consists of water containing therein a coating material and then orienting such tubular film simultaneously along biaxial directions. More particularly, the unoriented tubular film, with its inside surface having a uniform and still fluid layer of coating liquid is advanced and longitudinally stretched between two spaced pairs of nip rolls driven at different circumferential speeds. During such advancement, the film is heated to a temperature which allows for the orientation of the film and is higher than the boiling temperature of the coating liquid, and is expanded with a pressurized gas to thereby stretch the film in its transverse direction by the pressure of gas at the same time as it is stretched in its longitudinal direction.

In performing the process of the present invention, it is necessary to use such coating liquid as is an aqueous solution or an aqueous dispersed liquid and as has the characteristics to wet the surface of film uniformly, in order to avoid accidents as may be caused by organic solvents exploding the tubular film during stretching.

A coated, biaxially oriented film product with uniform quality can be continuously produced when the coating liquid employed has the characteristics to wet the surface of the film uniformly. With a coating liquid which does not uniformly wet the film surface, a portion of the film at which the coating liquid sticks in liquid drop form can not be sufficiently stretched with the result that such portion presents an appearance such as a fisheye, remarkably lowering the quality of the resulting film. Further continuous stretching operation at times is difficult because the film portions at which are located drops of coating liquid will stretch differently from those film portions having no such drops of coating liquid.

The present invention is characterized in that simultaneously biaxially oriented film with a coated surface is manufactured by feeding an unoriented tubular thermoplastic resin film, with its inner surface wetted in advance uniformly with a coating liquid consisting of water containing therein a coating material, to a stretching zone with the coating liquid in an undried state, and then stretching such coated film while it is in its tubular shape at such stretching temperature as is higher than the boiling temperature of the coating liquid to vaporize the water therefrom.

Although the present invention is not limited to a particular manner by which the coating liquid is fed to the inside of the unoriented tubular thermopulastic film, it is desirable to supply the coating liquid through a ring shaped die, from which the tubular thermoplastic resin film is initially extruded in a molten state, and into that portion of the extruded tubular film which is cooled prior to being advanced in between a pair of nip rolls.

The present invention is hereafter described in detail referring to the attached drawings in which.

Figure 1:
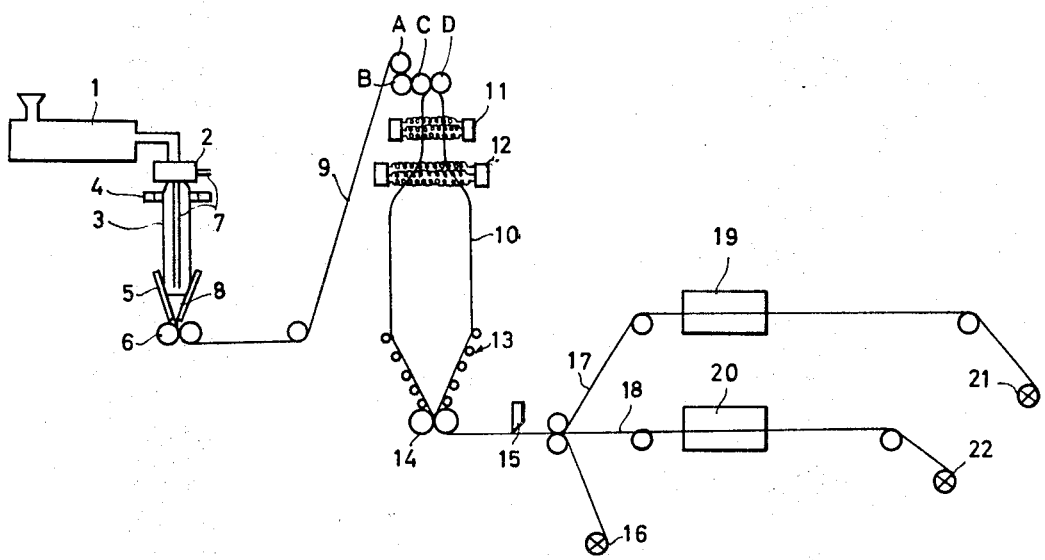
FIG. 1 shows a diagrammatic view of the process of the present invention.
Figure 2:
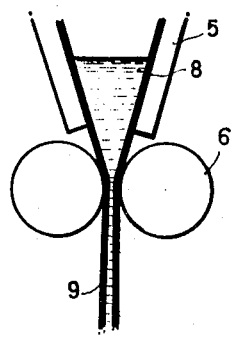
FIG. 2 shows a fragmentary view, on an enlarged scale of a guide device employed in the process shown in FIG. 1.
Figure 3:
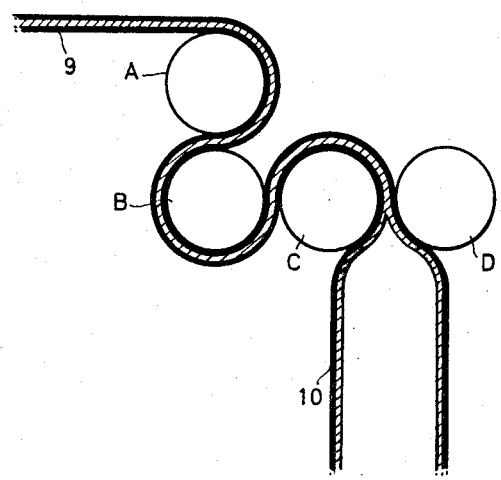
FIG. 3 shows a fragmentary view, on an enlarged scale of a group of rolls (A), (B), (C) and (D) employed in the process shown in FIG. 1.

In FIGS. 1 to 3, a tubular thermoplastic resin film 3 is extruded downwardly from a ring shaped die 2 of an extruder 1, cooled from the outside by an air-ring 4, folded by a guide device 5, and advanced from the die 2 by nip rolls 6. By a conduit 7 a coating liquid 8, as has the characteristics to wet the surface of the thermoplastic resin film uniformly and which consists of water containing therein a coating material, is fed into the tubular thermoplastic resin film 3. The tubular thermoplastic resin film, with its inside uniformly wetted with the liquid coating material as it passes between the nip rolls 6, is indicated at 9 and is passed in its folded state through a group of low speed nip rolls (A, B, C and D) of a stretching machine (stretcher).

The quantity of the coating liquid which sticks on the inner surface of the tubular film 9 as it is made flat by the nip rolls 6 is controlled by the quantity and the viscosity of the coating liquid 8 fed into the tubular film, and pressure of the nip rolls 6 and the low speed nip rolls (A, B, C and D).

After the folded tubular film 9, with its inside uniformly wetted with the coating liquid, passes beyond the group of the nip rolls (A, B, C and D), it is fed through a guide 13 and in between high speed nip rolls 14. During such travel a pressurized gas is fed into the tubular film by some suitable means and the film is heated by radiant ring shaped heaters 11 and 12 up to a temperature which is higher than the boiling temperature of the coating liquid 8 to vaporize the water therefrom and which allows for the orientation of the resin molecules. The film is thus stretched as shown at 10 in the FIG. 1. The stretched film is then made flat by the guide 13, and advanced by high speed nip rolls 14, after which both of its longitudinal edges are cut off at 15 and rolled up at 16. The resulting sheets of coated, oriented film 17, 18 are separated and are heatset by some suitable means, such as heated rolls 19, 20, and then wound up at 21 and 22.

A coating liquid 8 which gives the film antistatic characteristics may be an aqueous solution or an aqueous dispersed liquid of amide of fatty acid, ethylene oxide compound, alkylene phosphate, imidazoline family, etc., which has the characteristics to wet the surface of the tubular thermoplastic resin film uniformly can be used.

A coating liquid which gives the film desired slip characteristics may be an aqueous dispersed liquid of ester of higher alcohol, amide of fatty acid, metallic soap, Japan tallow, etc., which has the characteristic to wet the surface of the film uniformly.

If the cotaing liquid employed is an aqueous dispersed liquid, for example, of chlorinated polypropylene, copolymer of ethylene and vinylacetate, rubber, etc., which has heat and pressure sensitive characteristics and the characteristics to wet the surface of the tubular thermoplastic resin film uniformly, the contained water is not yet vaporized when the film passes through the low speed nip rolls so that the coating liquid does not at that stage possess adhesive characteristics. The coating material, however, will have adhesive characteristics as the contained water is vaporized from the coating liquid during the heat-stretching process so that the film can be laminated, by binding under the presure of the high speed nip rolls or further heated pressure rolls.

Figure 4:
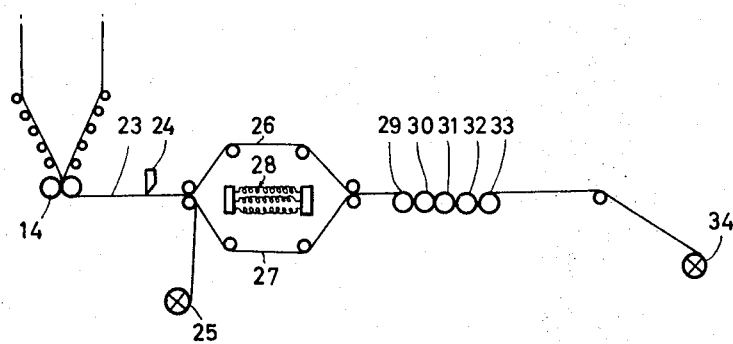
FIG. 4 shows a diagrammatic view which illustrates a modification of the process shown in FIG. 1.

If, with a particular coating material sufficient binding cannot be obtained under the pressure of high speed nip rolls alone, it is also possible to cutoff at 24 both edges of the flattened tubular film 23 after it has been advanced beyond the high speed nip rolls 14 as is shown in FIG. 4. The edges of the tubular film which are cut off are wound up at 25. The remainder of such coated, oriented tubular film is separated into two sheets of films 26, 27 which are passed relative to a heating device 28 where the coated surfaces thereof are heated and then bonded to each other as they are together passed over heating and pressing rolls 29, 30, 31 and cooling rolls 32, 33 to provide a laminated film, which is wound up at 34.

EXAMPLE 1

In a manner as shown in FIG. 1, into an unoriented tubular polypropylene film having a 70 mm. diameter and 200 mm. thickness, was delivered a 5% aqueous solution of antistatic agent which had the characteristics to wet the surface of polypropylene film uniformly. Such unoriented tubular film was passed through the low speed nip roll group as shown in FIG. 1 at a speed of 1 m./minute, whereby the inner surface of the tubular film was wetted uniformly with the coating liquid. Upon being advanced beyond the group of low speed nip rolls (A, B, C and D), pressurised air was introduced into the tubular film while the film was heated by 2 sets of heaters, one consisting of 2 ring-shaped infrared heaters of 1.5 kw. and the other consisting of 4 ring-shaped infrared heaters of 1.5 kw. In this manner the tubular film was stretched 3 times in its longitudinal direction and also 3 times in its transverse direction. The stretched tubular film was flattened by the guiding device 13, advanced by the high speed nip rolls, and cup open along both longitudinal edges to provide two sheets of film. These two sheets of simultaneously biaxially oriented polypropylene film, each with one coated surface, were then wound up. It goes without saying that the stretched film can be heat set either before or after being wound up.

A coated surface of the thus produced simultaneously biaxially oriented polypropylene film was rubbed with a flannel cloth 20 times under a constant condition and immediately thereafter was brought neat to a leaf-electroscope whereupon the leaf thereof opened a distance of 10 mm. On the other hand the measurement carried out under the same condition on the uncoated simultaneously biaxially oriented polypropylene film revealed that the leaf opened a distance of 150 mm., from which fact the coating effect with the process of the present invention is clear.

What is claimed is:

1. A process for manufacturing simultaneously biaxially oriented thermoplastic film having a coating on one surface thereof including the steps of uniformly wetting the inside surface of successive portions of a preformed advancing, unoriented tubular film formed of thermoplastic resin with a coating liquid consisting of water containing therein a coating material, passing the successive portions of such coated, unoriented tubular film between spaced pairs of driven nip rolls with the leading pair of such nip rolls being driven at a higher circumferential speed than the trailing pair thereof, during advancement between the spaced pairs of nip rolls heating the successive portions of such coated tubular film to a temperature which is higher than the boiling temperature of the applied coating liquid whereby the water is vaporized while the coating material in such liquid remains on the inside surface of the tubular film, delivering a gas under pressure into the advancing successive portions of the coated tubular film concomitantly with the heating thereof to expand the same whereby such successive portions of the tubular film with the coating material thereon are stretched simultaneously along transverse and longitudinal directions, and cooling the successive portions of the stretched, coated tubular film as they are advanced beyond the leading pair of nip rolls.

2. A process as defined in claim 1 further including the step of heat-setting the coated tubular film subsesuent to the biaxial stretching thereof.

3. A process as defined in claim 1 wherein said coating material remaining on the inside surface of the tubular film after the water is vaporized from the coating liquid possesses adhesive characteristics, and further including the steps of flattening and pressing the successive portions of the coated, stretched tubular film whereby the contacting portions thereof are laminated to each other by the coating thereon.

4. A process as defined in claim 1 wherein the coating material is a slip agent.

5. A process as defined in claim 1 wherein the coating material is an antistatic agent.

6. A process as defined in claim 1 wherein the tubular film is formed of polypropylene.

7. A process as defined in claim 1 wherein the coating liquid is a solution of coating material in water.

8. A process as defined in claim 1 wherein the coating liquid is a dispersion of coating material in water.

References Cited

UNITED STATES PATENTS

| | | | |
|---|---|---|---|
| 2,488,571 | 10/1949 | Trull | 204—95 |
| 2,955,318 | 10/1960 | Cook et al. | 264—95 |
| 3,022,543 | 2/1962 | Baird, Jr., et al. | 117—7 |
| 3,090,998 | 5/1963 | Heisterkamp et al. | 264—95 |
| 3,260,776 | 7/1966 | Lindstrom et al. | 117—7 |
| 3,265,552 | 8/1966 | Gerggren et al. | 117—95 |
| 3,280,234 | 10/1966 | Osborn | 264—95 |
| 3,340,122 | 9/1967 | Hofer | 264—95 |

ALFRED L. LEAVITT, Primary Examiner

M. F. ESPOSITO, Assistant Examiner

U.S. Cl. X.R.

117—95, 138.8; 264—95